(12) United States Patent
Brabander

(10) Patent No.: US 10,837,471 B2
(45) Date of Patent: Nov. 17, 2020

(54) PISTON CYLINDER SYSTEM WITH AT LEAST ONE TUBULAR ELEMENT

(71) Applicant: Benteler Steel/Tube GmbH, Paderborn (DE)

(72) Inventor: Helwig Brabander, Salzkotten (DE)

(73) Assignee: Benteler Steel/Tube GmbH (DE)

( * ) Notice: Subject to any disclaimer, the term of this patent is extended or adjusted under 35 U.S.C. 154(b) by 111 days.

(21) Appl. No.: 16/041,120

(22) Filed: Jul. 20, 2018

(65) Prior Publication Data

US 2019/0024681 A1   Jan. 24, 2019

(30) Foreign Application Priority Data

Jul. 24, 2017 (DE) .......... 10 2017 116 615

(51) Int. Cl.
| | | |
|---|---|---|
| F15B 15/14 | (2006.01) | |
| F15B 15/28 | (2006.01) | |
| F16F 9/32 | (2006.01) | |
| F16J 10/04 | (2006.01) | |
| F15B 15/16 | (2006.01) | |

(52) U.S. Cl.
CPC .......... *F15B 15/1428* (2013.01); *F15B 15/16* (2013.01); *F15B 15/2807* (2013.01); *F15B 15/2861* (2013.01); *F16F 9/3235* (2013.01); *F16J 10/04* (2013.01); *F15B 2215/305* (2013.01)

(58) Field of Classification Search
CPC .......... F15B 15/2861; F15B 2215/305
See application file for complete search history.

(56) References Cited

U.S. PATENT DOCUMENTS

| | | | |
|---|---|---|---|
| 3,185,043 A | 5/1965 | Dunham | |
| 3,585,906 A * | 6/1971 | Kraakman | F15B 15/149 92/111 |
| 3,743,248 A * | 7/1973 | Moor | B66F 3/35 254/93 R |
| 4,793,241 A | 12/1988 | Mano et al. | |
| 6,331,772 B1 | 12/2001 | Windte et al. | |
| 9,062,694 B2 | 6/2015 | Fletcher et al. | |
| 2003/0121574 A1* | 7/2003 | Brenner | B23K 10/027 148/565 |
| 2011/0283879 A1* | 11/2011 | Schwindaman | F15B 15/1428 92/164 |
| 2012/0055145 A1* | 3/2012 | Blieske | F02C 6/16 60/327 |
| 2015/0075402 A1* | 3/2015 | Henck | C06D 5/00 102/530 |

(Continued)

FOREIGN PATENT DOCUMENTS

| | | |
|---|---|---|
| CN | 205047570 | 2/2016 |
| DE | 394043801 C1 | 5/1991 |

(Continued)

*Primary Examiner* — Michael Leslie
*Assistant Examiner* — Matthew Wiblin
(74) *Attorney, Agent, or Firm* — Pandiscio & Pandiscio

(57) ABSTRACT

The present invention relates to a piston cylinder system for a working device, wherein the piston cylinder system comprises at least one tubular element and at least one piston which is guided in the at least one tubular element. The piston cylinder system is characterized in that at least one tubular element consists of high-manganese-steel and the inner side of the at least one tubular element is machined.

16 Claims, 2 Drawing Sheets

(56) References Cited

U.S. PATENT DOCUMENTS

2017/0016702 A1    1/2017  Vietoris et al.

FOREIGN PATENT DOCUMENTS

| DE | 196 48 335 | 6/1998 | |
|----|------------|--------|---|
| DE | 19723795 | 12/1998 | |
| DE | 102013014282 A1 * | 3/2015 | .......... F15B 15/2861 |
| EP | 0 005 910 | 12/1979 | |
| JP | H0718006 | 5/1995 | |

* cited by examiner

PISTON CYLINDER SYSTEM WITH AT LEAST ONE TUBULAR ELEMENT

REFERENCE TO PENDING PRIOR PATENT APPLICATION

This patent application claims benefit of German Patent Application No. 10 2017 116 615.7, filed 24 Jul. 2017 by Benteler Steel/Tube GmbH for PISTON CYLINDER SYSTEM WITH AT LEAST ONE TUBULAR ELEMENT, which patent application is hereby incorporated herein by reference.

FIELD OF THE INVENTION

The present invention relates to a piston cylinder system with at least one tubular element.

BACKGROUND OF THE INVENTION

Today, welded or seamless cold-drawn tubes are used for producing cylinder shell tubes. These tubes generally consist of construction steel.

Determining the position of the piston in the cylinder can be effected mechanically, for example by means of a cable pull system. Alternatively, magnetic inductive systems are known for position determination. Therein, signals are exchanged between a magnet which is attached to the piston and a sensor on the outer side of the cylinder. Such a magnetic inductive system is described, for example, in U.S. Pat. No. 9,062,694 B2. Therein, in particular a ferromagnetic material, in particular steel is used as material for the cylinder.

In such magnetic inductive measuring systems high measuring inaccuracy and measuring uncertainty exist. These disadvantages are due the fact that a remainder of magnetism, that means the remanence, in the cylinder tube cannot be excluded. In addition, the cylinder tube must have a large wall thickness, in order to be able to withstand ambient conditions, in particular the high inner pressure during operation of the piston cylinder system. Due to the large wall thickness, the detection of the position of the magnet inside the cylinder tube by means of a sensor which is attached on the outside is impeded or is not possible.

SUMMARY OF THE INVENTION

The object of the present invention is thus to provide a piston cylinder system, in which a magnetic inductive measuring system with high measuring accuracy can be used and which, in addition, can withstand mechanical loads well, even at low weight.

The present invention is based on the finding that this object can be achieved, by using a manganese steel, in particular a high-manganese steel, at least as material for the tubular element of the piston cylinder system and by subjecting this tubular element to appropriate processing steps.

According to the present invention, the object is thus solved by a piston cylinder system, wherein the piston cylinder system comprises at least one tubular element and at least one piston which is guided in the at least one tubular element. The piston cylinder system is characterized in that the at least one tubular element consists of a high-manganese steel and that the inner side of the at least one tubular element is machined.

According to the invention a system, wherein a piston is guided in one tubular element or several tubular elements, is referred to as a piston cylinder system. The piston cylinder system can be designed as an active element or as a passive element. The piston cylinder system can be, for example, a drive piston cylinder system or a damping system. In particular, the piston cylinder system serves for a working device. The working device may be a construction machinery or agricultural machinery. Alternatively, the working device may be a commercial vehicle. The piston cylinder system can also be referred to as actuator and in particular represents a linearly guided actuator.

The tubular element can also be referred to as a cylinder tube or precision tube. The tubular element is manufactured from a tube, in particular the tubular element is cut to length from an appropriately treated tube, and may, if necessary, be subjected to further processing steps.

According to the invention, the tubular element consists of high-manganese steel. In particular, a steel which has a manganese content of at least 10 wt.-% is understood to be a high-manganese steel. Particularly preferably the high-manganese-steel has a manganese content of at least 14 wt.-%. With this manganese content an austenitic structure reliably forms. In addition, a good toughness at low temperatures can be ensured by a manganese content of at least 14 wt.-%. The manganese content may be, for example, up to 40 wt.-%. A higher manganese content would lead to the steel losing its flowability and the steel manufacturing would be impeded.

Furthermore, the inner side of the at least one tubular element is machined, that means is present in a machined state. Machining herein refers to a metal cutting or metal chipping process. By means of machining, desired surface properties can reliably be set.

By using a high-manganese steel in the present invention, the magnetizability of the tube can be minimized. Thereby, high measuring accuracies can be achieved with a magnetic inductive measuring. Surprisingly, it has proven that a tubular element can be manufactured from high-manganese steel and that it can also be machined. In particular, according to the present invention, the inner side of the tubular is machined.

Since this is the area along which the piston which is guided in the tubular element slides, machining of the surface is advantageous. Thereby, in particular a low surface roughness can be established and also predefined tolerances can be met.

According to an embodiment, the tubular element consists of a cold-drawn seamless tube or a welded and cold-drawn tube. Surprisingly it has proven that a hot-rolled tube can be produced by rolling high-manganese steel and that the hot-rolled tube may subsequently be formed to a tube in at least one cold drawing step. In particular with seamless tubes it is advantageous that applying pressure to the tubular element which is produced from the tube, for example in an application as a tubular element of a hydraulic or pneumatic system, does not lead to damaging the tubular element, in particular does not lead to a deformation thereof. According to the invention, also a welded tube can be used. There, it has surprisingly be found, that the roll forming and in particular the subsequent welding of the tube, which consists of high-manganese steel, is possible and that after cold forming it can be used as a tubular element for a piston cylinder system.

According to a preferred embodiment, the at least one tubular element has a roughness value (Ra) at the inner side, which is <=0.4 µm, preferably <=0.3 µm and particularly preferably <=0.2 µm. So far, the roughness has been indicated for precision tubes with a surface roughness of 0.4 µm for the outer side and inner side. With the present invention, the roughness at the inner side is, however, further minimized and the low roughness values are thus set. Thereby, the actuating of the piston, that means the movement of the piston in the tubular element, can be performed with as low of frictional resistance as possible and the operation of the piston cylinder system is thereby reliably enabled. The roughness value (Ra) is the arithmetic mean roughness value, which is determined from a surface profile which has been measured by means of profile method (DIN EN ISO 4287). Preferably, the Merkel Counter Surface Parameter (MCP) which have been developed by the company Merkel Freudenberg Fluidtechnic GmbH are within the following ranges for the inner side of the at least one tubular element:

$R_{pk}$: 0-0.5 µm
$R_{pkx}$: 0-0.5 µm
$R_k$: 0.25-0.7 µm
$R_{vk}$: 0.20-0.65 µm
$R_{vkx}$: 0.20-2.00 µm Therein $R_{pk}$ and $R_{pkx}$ denote values, which describe the profile peaks and, therefore, the abrasivity. The core peak-to-valley height $R_k$ characterizes the long-term behaviour. The surface recesses characterize the abrasivity involved by grooves and/or describe oil deposits and are expressed by the parameters of the reduced groove depth $R_{vk}$, $R_{vkx}$. These values are determined by deriving from the surface profile the curve for material share (Abott-Firestone-curve), in which the profile height is plotted against the material share (DIN EN ISO 13565-1 and -2).

The inner side of the at least one tubular element can be, for example, machined by scalping and flat rolling and/or honing. By these types of machining, the surface at the inner side of the tubular element can be produced with the desired properties. Surprisingly, it has proven, that this type of processing is also possible on a tube which consists of high-manganese steel.

According to a preferred embodiment, the inner tolerance of the at least one tubular element is within the range of ISO 286 part 2 H8 or H9.

According to an embodiment the tubular element has a wall thickness in the range from 4 to 20 mm, preferably 6 to 15 mm. Such small wall thicknesses can be used in the piston cylinder system according to the invention, since a high strength and pressure resistance is provided by the high-manganese steel. Hence, also with small wall thicknesses a reliable operation of the piston cylinder system can be ensured without fear of damaging of the tubular element during operation. Alternatively, the wall thickness can also be chosen to be larger and this can then allow for a higher inner pressure to be applied.

According to an embodiment, the piston cylinder system is a drive system, in particular a hydraulic or pneumatic system, of a working device. Alternatively, the piston cylinder system can also be a damping system of a working device. In particular, the piston cylinder system may represent a linearly guided actuator of a working device. The present invention may be used, for example, with working devices such as constructional machineries and/or agricultural machineries or commercial vehicles.

According to a preferred embodiment the at least one tubular element consists of a material with austenitic microstructure. This microstructure can be obtained, for example, by a manganese content of more than 14 wt.-% in the steel and a further addition of carbon.

According to the invention it is also possible to use as material for the at least one tubular element a high-manganese steel having a manganese content of at least 18 wt.-%.

One advantage of this high manganese content is that for manufacturing the tubular element a tube can be subjected to severe cold forming and the tubular element is nevertheless not magnetizable. Thus, a remanence in the tubular element which would lead to measurement inaccuracies with magnetic inductive measuring can be prevented.

In addition in particular with such high manganese content the toughness at low temperatures of the tubular element can be improved and the piston cylinder system can thus be also be used at low temperatures, for example can be used in arctic conditions. In addition, it can be assumed that due to such high manganese content nitrogen can be kept in solution and thereby the austenite in the steel can be stabilized.

The advantage of an austenitic structure in particular lies in the fact that due to the face-centered lattice, the tubular element which consist of a material which has such a structure, does not act ferromagnetic.

The steel of which the at least one tubular element consists can preferably have a carbon content of <0.78 wt.-%. With such low carbon content it is prevented that the steel becomes too brittle and/or hard during welding. Preferably, the steel has at least 0.03 wt-% of carbon. Thereby, the TRIP-Effect in the steel, that means the TRIP property of the steel can still be used.

In addition, the steel of which the at least one tubular element consists, has for example a maximum of 5 wt.-% chromium, preferably a maximum of 2 wt.-% chromium. By the addition of chromium in these quantities scaling of the tubular element can be prevented by forming a passivating layer.

In addition, the steel preferably contains aluminum in order to reduce hydrogen embrittlement. Aluminum is, however, preferably added in an amount of a maximum of 5 wt.-%. With higher aluminum content, aluminum may remain beyond a nitride binding which can be disturbing during steel manufacturing.

Further optional alloying elements which may be present in the steel are Nb, Ti and/or V. These alloying elements, if added, are preferably added in amounts the sum of which has a maximum of 0.2 wt.-%. Thereby grain refinement in the structure is supported as the carbides and/or nitrides of these alloying elements limit the grain growth.

The vanadium content preferably has a maximum of 0.2 wt.-%. Thereby carbides or nitrides are formed.

The niobium content preferably has a maximum of 0.2 wt.-%. Thereby carbon nitrides are formed, whereby nitrogen is bound.

The titanium content preferably has a maximum of 0.1 wt.-%. Thereby nitrides are formed, whereby nitrogen is bound.

A steel which may be used for the at least one tubular element of the piston cylinder system can in particular have the following alloying elements in wt.-%, wherein the remainder is iron and inevitable impurities:

C: 0.03-0.78
Si: 0.03-5
Mn: 14-40
S: ≤0.03
P: ≤0.03
Al: 0.03-5
N: <0.1
Cr: <5
Mo: <2.5
Cu: <2.5
V: <0.5

An example of an analysis of a steel which can be used for the at least one tubular element of the piston cylinder system is shown in the following table. The contents of the alloying elements are given in wt.-%, wherein the remainder is iron and inevitable impurities.

| C | Si | Mn | S | P | Al | N | Cr | Mo | Cu | V |
|---|---|---|---|---|---|---|---|---|---|---|
| 0.1-0.5 | 0.1-3 | 15-30 | <0.001 | ≤0.03 | 0.5-3 | <0.04 | 0.1-4 | <1.5 | <1 | <0.25 |

According to an embodiment the at least one tubular element has at the inner side an edge decarburized zone with a carbon content which is reduced by 5 to 10 percent. Preferably, the edge decarburized zone extends to a depth from 10 to 150 μm from the inner surface.

By the edge decarburized zone the TRIP-effect is achieved during cold drawing by the transformation of metastable austenite to martensite in the edge decarburized zone. Thereby, the advantage is achieved that the tubular element can more easily be machined and at the same time is less wear prone and is less abrasive to sliding gasket elements. In particular, a targeted strengthening or increase of hardness at the inner side of the cylinder is achieved. Alternatively or additionally, also the outer side of the piston may have an edge decarburized zone and incur the same advantages there.

According to an embodiment, the edge decarburized zone has at least partially a martensitic microstructure. The hardness HV (Vikers hardness) in the edge decarburized zone is preferably higher than 400. Surprisingly, it has proven that a tubular element which is formed in this way with such a thin edge decarburized zone maintains the good properties according to the invention with respect to magnetizibility despite of martensitic microstructure which is contained therein.

The edge decarburized zone can be produced by annealing treatment during the forming or between forming steps of the tubular element under oxidizing atmosphere. Therein the annealing temperature and annealing duration as well as further parameters such as gas composition in the atmosphere can be set in a targeted manner in order to influence the depth and the properties of the structure in the edge decarburized zone.

According to a preferred embodiment the piston cylinder system comprises a measuring device, in particular a magnetic inductive measuring device. The measuring device preferably has at least one sensor at the outer side of the tubular element and at least one magnet on the piston. Preferably, several sensors are provided in a sensor array at the outer side of the tubular element. This embodiment of the measuring device as a magnetic inductive measuring device is of particular advantage in the present invention, since due to the high-manganese steel, which is used as material for the at least one tubular element, a remanence can be avoided and thereby extremely reliable measuring results can be obtained with the measuring device. The measuring device can also be referred to as sensor system and may comprise besides the one or several magnets and the one or several sensors also a controller and, if appropriate, a processing unit for processing the sensor signals.

It is, however, also within the scope of the present invention that the measuring device has at least one magnet and at least one sensor, wherein the at least one magnet is provided at the outer side of the tubular element and the at least one sensor is provided inside the tubular element, for example at the piston or at a piston rod of the piston. Preferably, also in this embodiment several sensors are provided in a sensor array inside the tubular element. The measuring device can also be referred to as sensor system and may comprise besides the one or several magnets and the one or several sensors also a controller and, if appropriate, a processing unit for processing the sensor signals.

According to one embodiment the piston cylinder system comprises at least two tubular elements. The tubular elements may have different diameters and in particular may be inserted into one another. Thereby, the tubular elements in this embodiment form a telescopic cylinder. In this telescopic cylinder and in particular in the tubular element having the smallest diameter, the piston of the piston cylinder system can be guided.

The at least one tubular element of the piston cylinder system is preferably galvanized and/or lacquered at its outer side. The inner side of the tubular element is preferably uncoated, as this side generally during operation comes in contact with oil. In individual cases the tubular element may, however, also be coated or chromium-plated at the inside. In case of application of a zinc layer in contrast to heat-treatment steel no danger of hydrogen induced stress crack corrosion or hydrogen embrittlement exists.

According to one embodiment the at least one tubular element of the piston cylinder system has a zinc layer at its outer side. Despite the high strength of the used alloy no danger of hydrogen embrittlement exists due to the austenitic microstructure of the tubular element.

The tubular element of the system according to the invention can be manufactured in different ways. In particular, the tubular element can be manufactured from a seamless tube. The respective manufacturing route preferably comprises the following steps:

manufacturing a hot-rolled tube by punching and hot-rolling of an ingot or bloom
where appropriate, heat treatment of the hot-rolled tube
cold drawing of the hot-rolled tube
heat treatment and straightening of the cold-drawn tube
working the inside of the tube by scalping and flat rolling or potentially honing
cutting to length from the tube to a fixed length
machining in particular of connecting surfaces
mounting piston and sensor system
screwing on or welding the cut tubular element with bottom and top
if necessary lacquering the tubular element.

Furthermore the tubular element can be manufactured from a welded tube. The respective manufacturing route preferably comprises the following steps:

providing a coil
roll-forming and welding, in particular high frequency welding
cold drawing of the welded tube
heat treatment and straightening of the cold-drawn tube
working the inside of the tube by scalping and flat rolling or potentially honing
cutting to length from the tube to a fixed length
machining in particular of connecting surfaces
mounting piston and sensor system screwing on or welding the cut tubular element with
bottom and top if necessary lacquering the tubular element.

The top and the bottom can also be referred to closing plates. These are welded to the ends of the tubular element or a thread is provided machining and the closing plate is then screwed in at the end face.

BRIEF DESCRIPTION OF THE DRAWINGS

The invention will now be described again with reference to the enclosed figures.

DETAILED DESCRIPTION OF THE PREFERRED EMBODIMENTS

Figure 1:
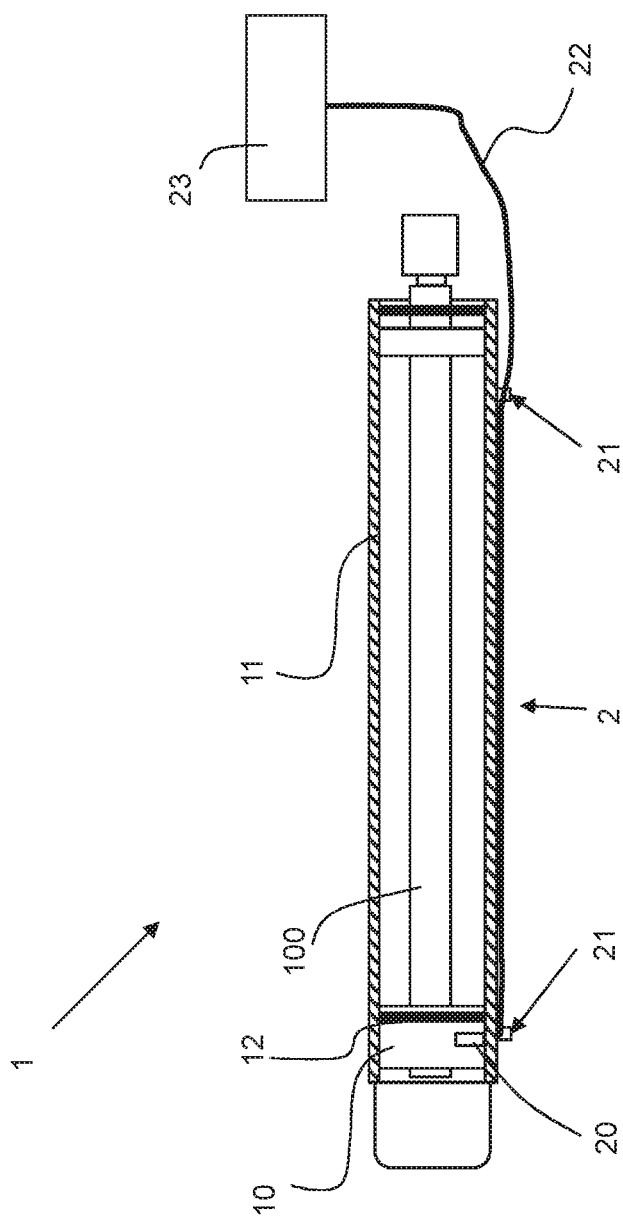
FIG. 1: shows an embodiment of a piston cylinder system according to the present invention.
Figure 2:
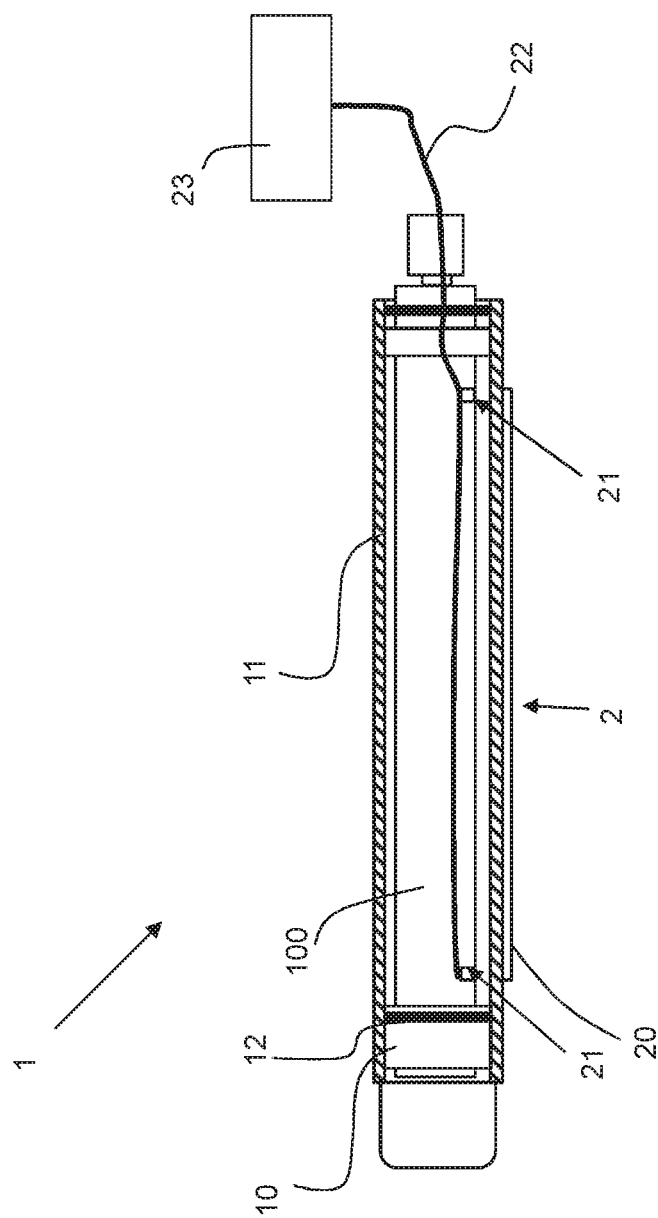
FIG. 2: shows a second embodiment of a piston cylinder system according to the present invention.

In the embodiments of the piston cylinder system 1 which are shown in FIGS. 1 and 2 the piston cylinder system 1 is a piston cylinder system 1 with a measuring device 2.

In the embodiment according to FIG. 1 the piston cylinder system 1 comprises a piston 10 and a tubular element 11, which serves as the cylinder of the piston cylinder system 1. On the outer side of the piston 10, a magnet 20 of the measuring device 2 is inserted. At the outer side of the tubular element 11 sensors 21 of the measuring device 2 are applied. The sensors 21 are connected to a controller 23 of the measuring device 2 via a cable or wire 22. In the depicted embodiment, sealings 12 are provided at the piston 10. In the depicted embodiment, the tubular element 11 consists of high-manganese steel. Thereby, during the measurement of the position of the piston 10 in the tubular element 11 a reliable measuring result can be achieved. In particular, no remanence of the tubular element 11 has to be feared, which would lead to a measuring inaccuracy.

In FIG. 2 a further embodiment of the piston cylinder system 1 is shown. This embodiment differs from the first embodiment in FIG. 1 only in that in this embodiment the sensors 21 are arranged inside the tubular element 11 and that magnets 20 are provided on the outer side of the tubular element 11.

Surprisingly, it has proven, that tubular elements for usage in piston cylinder systems can be manufactured from high-manganese steel and that the advantages of the high-manganese steel can be used in an advantageous way. According to an embodiment, the invention relates to a drive-piston-cylinder-system with a non-magnetizable, non-magnetic cylinder. This system can in addition comprise a measuring device for position determination of the piston. The present invention can be, for example, used in working devices, such as construction and/or agricultural machineries or commercial vehicles. Thus, the invention can be put to use at mobile or stationary working devices, for example, the invention can be put to use in presses. The working security of the working devices can be increased by the invention.

The tubular element which can also be referred to as cylinder tube and is used according to the invention as cylinder of the piston cylinder system has been machined at the inside and is present, for example, as a cylinder tube which is scalped and flat-rolled at the inside. It has been found, that with the present invention also Ra values of less or equal to 0.2 μm can be achieved.

One advantage of the present invention is that by the use of high-manganese steel tubes a clearly better and faster measuring result can be achieved. The advantages of using high-manganese steel are based on the austenitic structure state, which prevents magnetizing of the cylinder tube. In addition, when using high-manganese steel, reduction of wall thickness and thus saving of weight can be realized with the cylinder, which is in particular due to the higher strength properties.

In the present invention welded or seamless cold-drawn precision tubes of high-manganese steel can be used. These can be processed to be tubular elements which can also be referred to as cylinder shells of a piston cylinder system. The tubes are machined at their inner surfaces and can then be cut to length and can be welded or screwed with cylinder bottom and cylinder top. The cutting to length can also be carried out prior to the machining of the inner surface. The invention can be used in active systems, for example in systems with hydraulic or pneumatic cylinders, or can be used in active or passive damping systems. The piston cylinder system can also be referred to as actuator.

REVERENCE NUMERALS 1 piston cylinder system
10 piston
100 piston rod
11 tubular element (cylinder)
12 Sealing
2 Measuring device
20 magnet(s)
21 sensor(s)
22 cable/wire
23 controller

What is claimed is:

1. Piston cylinder system for a working device, wherein the piston cylinder system comprises at least one tubular element and at least one piston which is guided in the at least one tubular element, characterized in that (i) the at least one tubular element consists of a high-manganese steel having a manganese content of at least 14 wt.-%, (ii) the inner side of the at least one tubular element is machined and (iii) an inner tolerance of the at least one tubular element is within the range of ISO 286 part 2 H8 or H9 Version 2010-11.

2. Piston cylinder system according to claim 1, characterized in that the tubular element consists of a cold-drawn seamless tube or a welded and cold-drawn tube.

3. Piston cylinder system according to claim 1, characterized in that the at least one tubular element has a roughness value at the inner side which is <=0.4 μm.

4. Piston cylinder system according to claim 1, characterized in that the inner side of the at least one tubular element is machined by at least one from the group consisting of scalping, flat rolling and by honing.

5. Piston cylinder system according to claim 1, characterized in that the tubular element has a wall thickness in the range from 4 to 20 mm.

6. Piston cylinder system according to claim 1, characterized in that the piston cylinder system is a drive system, in particular a hydraulic or pneumatic system or a damping system of a working device.

7. Piston cylinder system according to claim 1, characterized in that the at least one tubular element consists of a material with austenitic microstructure and has a tensile strength Rm of at least 1,050 MPa, as well as a yield strength Rp 0.2 of at least 1,000 MPa.

8. Piston cylinder system according to claim 1, characterized in that the piston cylinder system further comprises a measuring device having at least one sensor at an outer side of the tubular element and at least one magnet at the piston.

9. Piston cylinder system according to claim 1, characterized in that the piston cylinder system further comprises a measuring device having at least one magnet and at least one sensor, wherein the at least one magnet is arranged at an outer side of the tubular element and the at least one sensor is provided inside of the tubular element.

10. Piston cylinder system according to claim 1, characterized in that the piston cylinder system comprises at least two tubular elements and the tubular elements together form a telescopic cylinder.

11. Piston cylinder system according to claim 1, characterized in that the at least one tubular element has at an inner side an edge decarburized zone with a carbon content reduced by 5 to 10 percent up to a depth from 10 to 150 μm.

12. Piston cylinder system according to claim 11, characterized in that the edge decarburized zone has at least a martensitic microstructure, in particular a hardness HV in the edge decarburized zone is higher than 400.

13. Piston cylinder system according to claim 1, characterized in that the tubular element of the piston cylinder system has a zinc layer at its outer side.

14. Piston cylinder system for a working device, wherein the piston cylinder system comprises at least one tubular element and at least one piston which is guided in the at least one tubular element,
   wherein the at least one tubular element consists of a high-manganese steel and the inner side of the at least one tubular element is machined,
   and further wherein the at least one tubular element has at an inner side an edge decarburized zone with a carbon content reduced by 5 to 10 percent up to a depth from 10 to 150 μm.

15. Piston cylinder system according to claim 14, characterized in that the edge decarburized zone has at least a martensitic microstructure, in particular a hardness HV in the edge decarburized zone is higher than 400.

16. Piston cylinder system for a working device, wherein the piston cylinder system comprises at least one tubular element and at least one piston which is guided in the at least one tubular element,
   wherein the at least one tubular element consists of a high-manganese steel and the inner side of the at least one tubular element is machined,
   and further wherein the tubular element of the piston cylinder system has a zinc layer at its outer side.

* * * * *